United States Patent
Lin

(10) Patent No.: US 10,246,308 B1
(45) Date of Patent: Apr. 2, 2019

(54) OBJECT-CONNECTING DEVICE

(71) Applicant: Yoke Industrial Corp., Taichung (TW)

(72) Inventor: Po-Hsiu Lin, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 16/176,219

(22) Filed: Oct. 31, 2018

(51) Int. Cl.
*B66C 1/66* (2006.01)
*F16B 33/00* (2006.01)

(52) U.S. Cl.
CPC .............. *B66C 1/66* (2013.01); *F16B 33/00* (2013.01)

(58) Field of Classification Search
CPC . B66C 1/66; B66C 1/666; F16B 33/00; F16B 33/002; F16G 15/08; Y10T 403/32213
USPC .................................. 294/215, 82.1
See application file for complete search history.

(56) References Cited

U.S. PATENT DOCUMENTS

| | | | | |
|---|---|---|---|---|
| 3,905,633 A | * | 9/1975 | Larson | B66C 1/107 248/499 |
| 5,248,176 A | * | 9/1993 | Fredriksson | B66C 1/34 248/499 |
| 6,068,310 A | * | 5/2000 | Fuller | B66C 1/66 294/215 |
| 6,443,514 B1 | * | 9/2002 | Fuller | B66C 1/66 294/215 |
| 9,255,625 B2 | * | 2/2016 | Smetz | B66C 1/66 |

FOREIGN PATENT DOCUMENTS

TW    I468602 B    1/2015

OTHER PUBLICATIONS

English language abstract for Taiwan Patent Document No. I468602, published on Jan. 11, 2015, total of 1 page.

* cited by examiner

*Primary Examiner* — Dean J Kramer
(74) *Attorney, Agent, or Firm* — Lynette Wylie; Apex Juris, Pllc.

(57) ABSTRACT

An object-connecting device includes an engaging member having a perforation, a first sleeve having a first axial hole, a first abutting surface, and a first recess, a second sleeve passing through the perforation, a bolt passing through the first axial hole and the second axial hole, and a retaining ring. The second sleeve has a second axial hole, a second abutting surface, and a second recess, wherein the second axial hole communicates with the first axial hole. The second abutting surface abuts against the first abutting surface. The second recess matches with the first recess to form a receiving groove. The retaining ring is disposed in the receiving groove and is fastened on the bolt. With the aforementioned design, the bolt could be prevented from disengagement.

8 Claims, 5 Drawing Sheets

OBJECT-CONNECTING DEVICE

BACKGROUND OF THE INVENTION

Technical Field

The present invention relates generally to a hanging structure, and more particularly to an object-connecting device.

Description of Related Art

An object-connecting device is usually detachably connected to an object (such as a mold, a large-sized machine, and etc.). By connecting a hanging device (such as a crane or the like) and the object-connecting device, an object connected to the object-connecting device could be hoisted.

A conventional connecting device 1, as disclosed in FIG. 1 of the Taiwan utility model patent I468602, includes an engaging member 2, two sleeves 3, 4, a bolt 5, and a hanging ring 6, wherein the two sleeves are inserted into a perforation 2a respectively via a top surface and a bottom surface of the engaging member 2. A body 5a of the bolt 5 passes through the two sleeves 3, 4, wherein a portion of the body 5a that has a threaded section 5b is located outside of the sleeve 4. The hanging ring 6 is pivotally connected to the engaging member 2. While using the conventional connecting device 1, the threaded section 5b of the bolt 5 is screwed into a threaded hole of a heavy object (such as a mold) first, and the hanging ring 6 is hung on a hanger of a hanging mechanism, thereby to carry out a hanging work to displace the heavy object. When the connecting device 1 is not in use, the connecting device 1 could be taken down by simply loosening the bolt 5 from the heavy object. In addition, in order to prevent the bolt 5 of the connecting device 1 from hurting someone by accidentally disengaging from the two sleeves 3, 4 in an unused situation, the connecting device 1 further includes a retaining ring 7, as shown in FIG. 1, wherein the retaining ring 7 is disposed in a recess 3a recessed into an inner wall of the sleeve 3 and in a groove 5c on the body 5b of the bolt 5, thereby to provide a resisting effect to prevent the bolt 5 from disengagement.

However, the recess 3a of the aforementioned connecting device 1 for receiving the retaining ring 7 is disposed at a middle portion of the sleeve 3, which may damage structural strength of the sleeve 3, so that when the connecting device 1 is under a force, especially a force in a horizontal direction of the connecting device 1 shown in FIG. 1, the sleeve 3 is weakened and insecure, therefore risking breakage.

In addition, a further drawback of the prior art is illustrated in reference to FIG. 4 of the Taiwan utility model patent I468602, wherein a groove 54b formed on a surface of a bolt 50 adjacent to a heavy object S is subjected to risking breakage when a connecting device is under a force (e.g. a shear force) in a horizontal direction of the connecting device. Therefore, persisting drawbacks associated with conventional connecting devices leave room for improvements.

BRIEF SUMMARY OF THE INVENTION

In view of the such drawbacks and need for improvement, a primary objective of the present invention is to provide an object-connecting device, which could prevent the bolt from loosening without compromising overall structural strength of the object-connecting device.

The present invention provides an object-connecting device, which includes an engaging member, a first sleeve, a second sleeve, a bolt, and a retaining ring, wherein the engaging member has a perforation. The first sleeve has a first axial hole, a first abutting surface, and a first recess. The second sleeve passes through the perforation and has a second axial hole, a second abutting surface, and a second recess, wherein the second axial hole communicates with the first axial hole. The second abutting surface abuts against the first abutting surface. The second recess matches with the first recess to form a receiving groove. The bolt passes through the first axial hole and the second axial hole. The retaining ring is disposed in the receiving groove and is fastened on the bolt.

With the receiving groove formed by the first recess and the second recess, the retaining ring may be readily provided at the bolt without compromising the structural strength of the object-connecting device, thereby to prevent the bolt from disengaging from the engaging member, the first sleeve, or the second sleeve.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
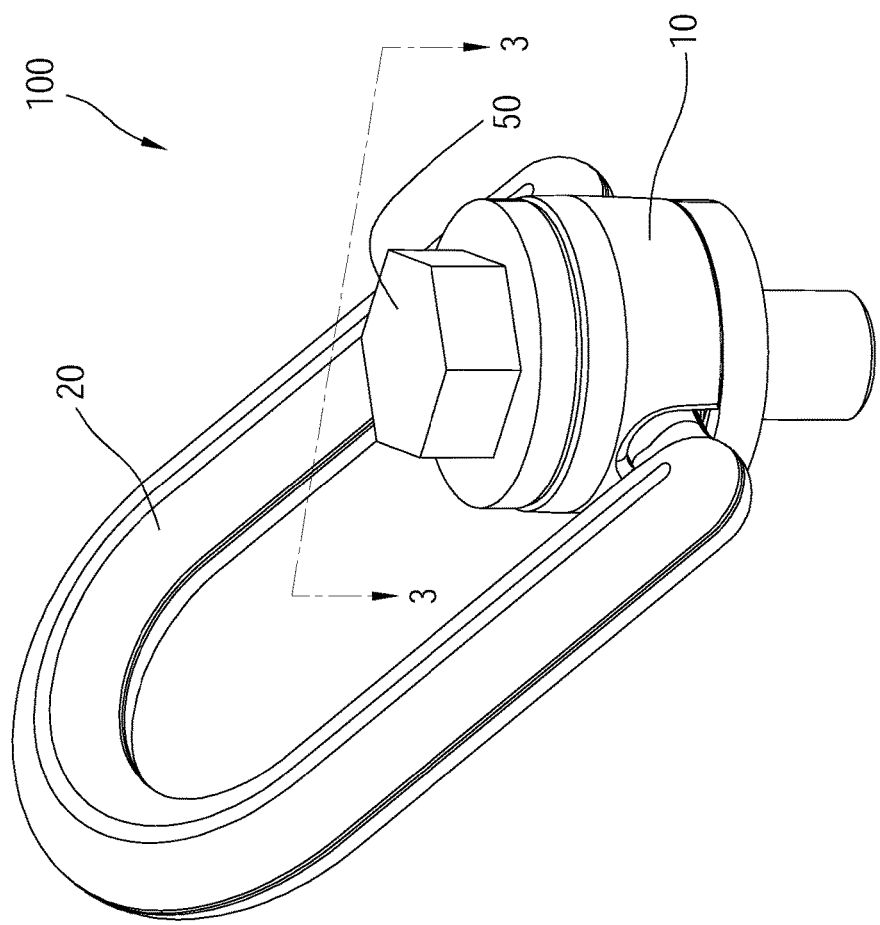
FIG. 1 is a perspective view of the object-connecting device of an embodiment according to the present invention.
Figure 2:
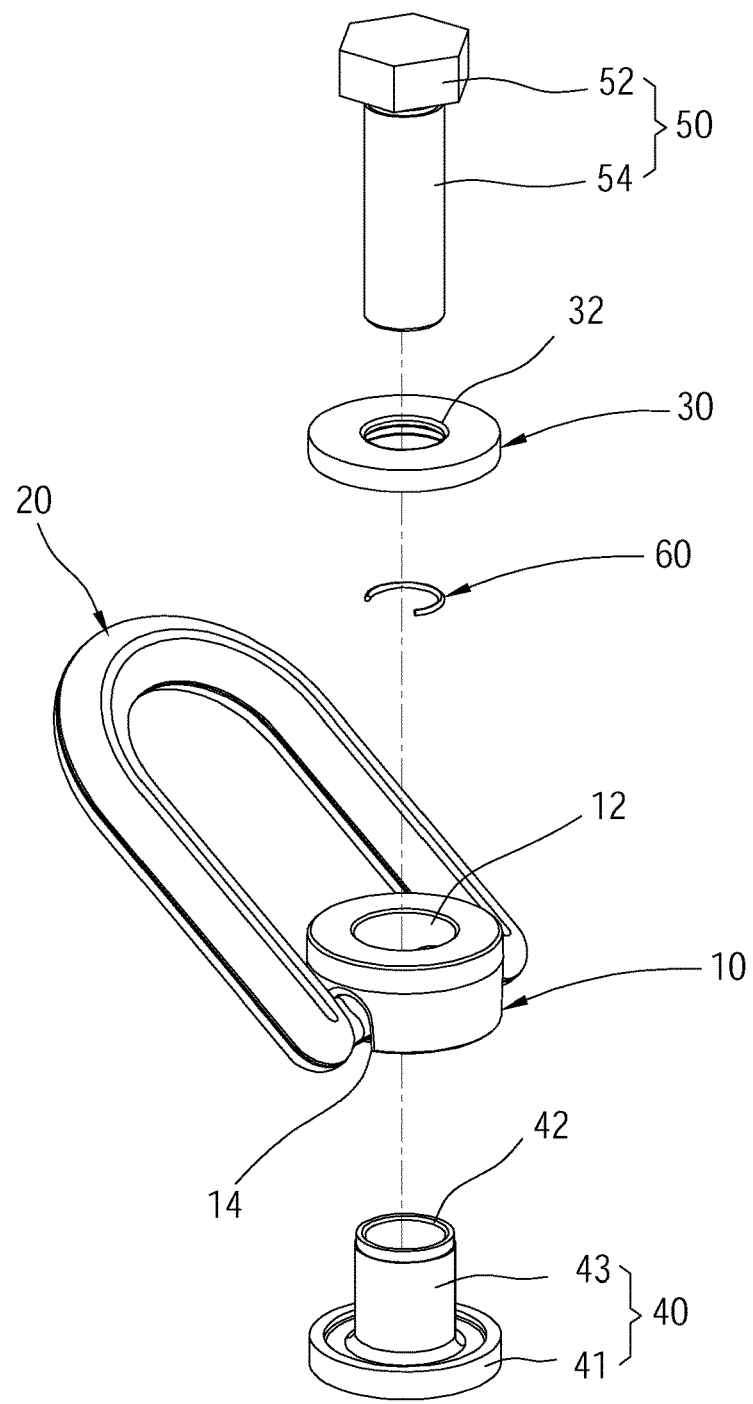
FIG. 2 is an exploded perspective view of FIG. 1.
Figure 3:
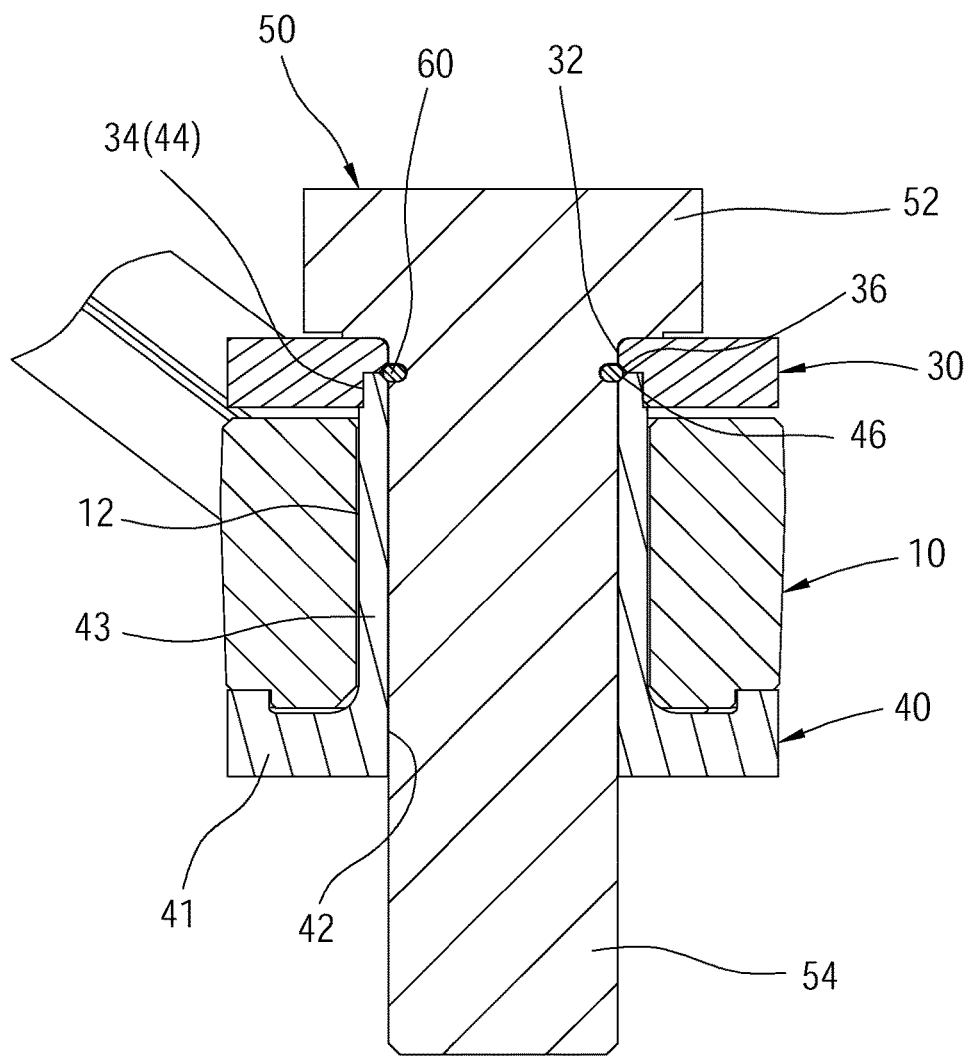
FIG. 3 is a sectional view along the 3-3 line in FIG. 1.
Figure 4:
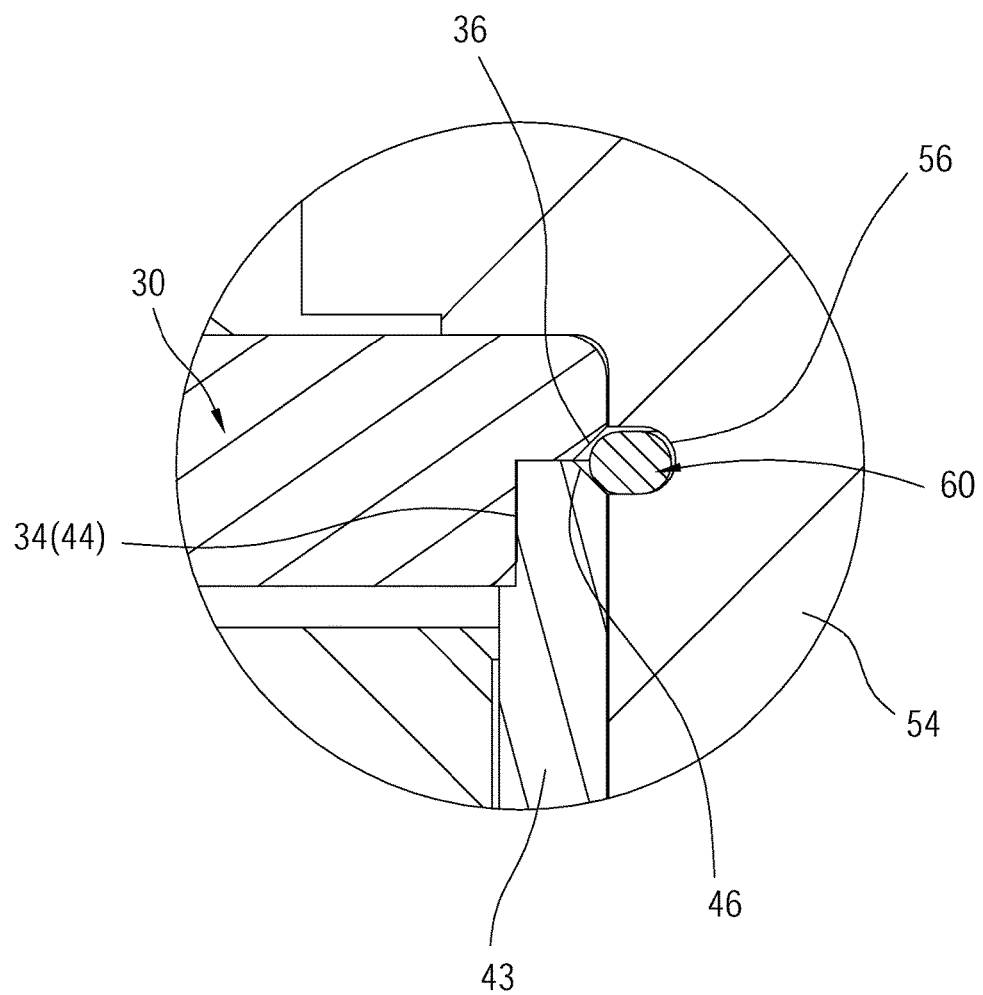
FIG. 4 is a partially enlarged view of FIG. 3.

An object-connecting device 100 of an embodiment according to the present invention is illustrated in FIG. 1 to FIG. 4 including an engaging member 10, a hanging ring 20, a first sleeve 30, a second sleeve 40, a bolt 50, and a retaining ring 60.

The engaging member 10 has a perforation 12 and a lateral opening 14. The hanging ring 20 is engaged with the engaging member 10 via the lateral opening 14 of the engaging member 10 and is capable of pivoting relative to the engaging member 10. The hanging ring 20 is adapted to be hung. For instance, the hanging ring 20 could be hung on a hanging mechanism, so that both of the object-connecting device 100 and an object (not shown) connected to the object-connecting device 100 could be hoisted.

The first sleeve 30 has a first axial hole 32, a first abutting surface 34, and a first recess 36. In the current embodiment, the first recess 36 of the first sleeve 30 is recessed into a wall of the first axial hole 32 of the first sleeve 30 adjacent to an edge of the second sleeve 40. More specifically, the first recess 36 could be a chamfer formed by processing an edge of the wall of the first axial hole 32 of the first sleeve 30. In an embodiment, the first recess 36 could be a conical section formed by processing an edge of the wall of the first axial hole 32 of the first sleeve 30.

The second sleeve 40 passes through the perforation 12 and has a second axial hole 42, a second abutting surface 44, and a second recess 46. When the second sleeve 40 is engaged with the first sleeve 30, the second axial hole 42 communicates with the first axial hole 32, and the second abutting surface 44 abuts against the first abutting surface 34, and the second recess 46 matches with the first recess 36 to form a receiving groove. In an embodiment, the second abutting surface 44 and the first abutting surface 34 could be a tight fit (i.e., an interference fit) or a screw fit. In the current embodiment, the second abutting surface 44 and the first abutting surface 34 are a tight fit, and the receiving groove is located within a projection area of the first sleeve 30 in a radial direction of the first sleeve 30.

In the current embodiment, the second sleeve 40 has a base 41 and a body portion 43 connected to the base 41, wherein the base 41 abuts against a bottom of the engaging member 10. The body portion 43 passes through the perforation 12 of the engaging member 10 and has the second abutting surface 44 and the second recess 46. More specifically, the body portion 43 passes through the perforation 12 and partially enters the first axial hole 32. A portion of the body portion 43 that enters the first axial hole 32 has the second recess 46. In the current embodiment, the second recess 46 is recessed into a wall of the second axial hole 42 adjacent to an edge of the first sleeve 30. More specifically, the second recess 46 could be a chamfer formed by processing an edge of the wall of the second axial hole 42 of the second sleeve 40. In an embodiment, the second recess 46 could be a conical section formed by processing an edge of the wall of the second axial hole 42 of the second sleeve 40.

The bolt 50 has a head 52 and a body 54, wherein the head 52 abuts against a top surface of the first sleeve 30, and the body 54 passes through the first axial hole 32 and the second axial hole 42.

The retaining ring 60 is received in the receiving groove and is fastened on the bolt 50. In the current embodiment, the retaining ring 60 is a C-shaped ring as an example and has a notch, so that the retaining ring 60 could be easily fastened on the bolt 50. In the current embodiment, an annular groove 56 is disposed on the body 54 of the bolt 50, wherein the retaining ring 60 could be disposed in the annular groove 56. In an embodiment, the retaining ring 60 could be an O-ring or another elastic ring.

In an embodiment, during the process of assembling, the first sleeve 30 could be abutted against a top surface of the engaging member 10 first, and the bolt 50 sequentially passes through the first axial hole 32 of the first sleeve 30 and the perforation 12 of the engaging member 10, and the retaining ring 60 is fastened on the body 54 of the bolt 50. After that, the second sleeve 40 fits around the body 54 of the bolt 50 and passes through the perforation 12 of the engaging member 10, and the second sleeve 40 is pushed to be close to the first sleeve 30. At this time, the retaining ring 60 would be pushed by the second recess 46 of the second sleeve 40 to be close to the first recess 36 of the first sleeve 30. Until the second abutting surface 44 of the second sleeve 40 abuts against the first abutting surface 34 of first sleeve 30, the retaining ring 60 would be pushed into the receiving groove formed by the first recess 36 and the second recess 46, so as to be firmly connected to the body 54 of the bolt 50 and the annular groove 56 of the bolt 50. In this way, the components of the object-connecting device 100 could be assembled easily, and the retaining ring 60 could be easily provided at a predetermined position on the bolt 50, thereby to prevent the bolt 50 from disengaging from the engaging member 10, the first sleeve 30, or the second sleeve 40. With the positioning design of both of the first recess 36 and the second recess 46, and the receiving groove formed by the first recess 36 and the second recess 46, a structural strength of both of the first sleeve 30 and the second sleeve 40 could not be compromised. Therefore, the object-connecting device 100 of the present invention is more durable than a conventional object-connecting device.

Figure 5:
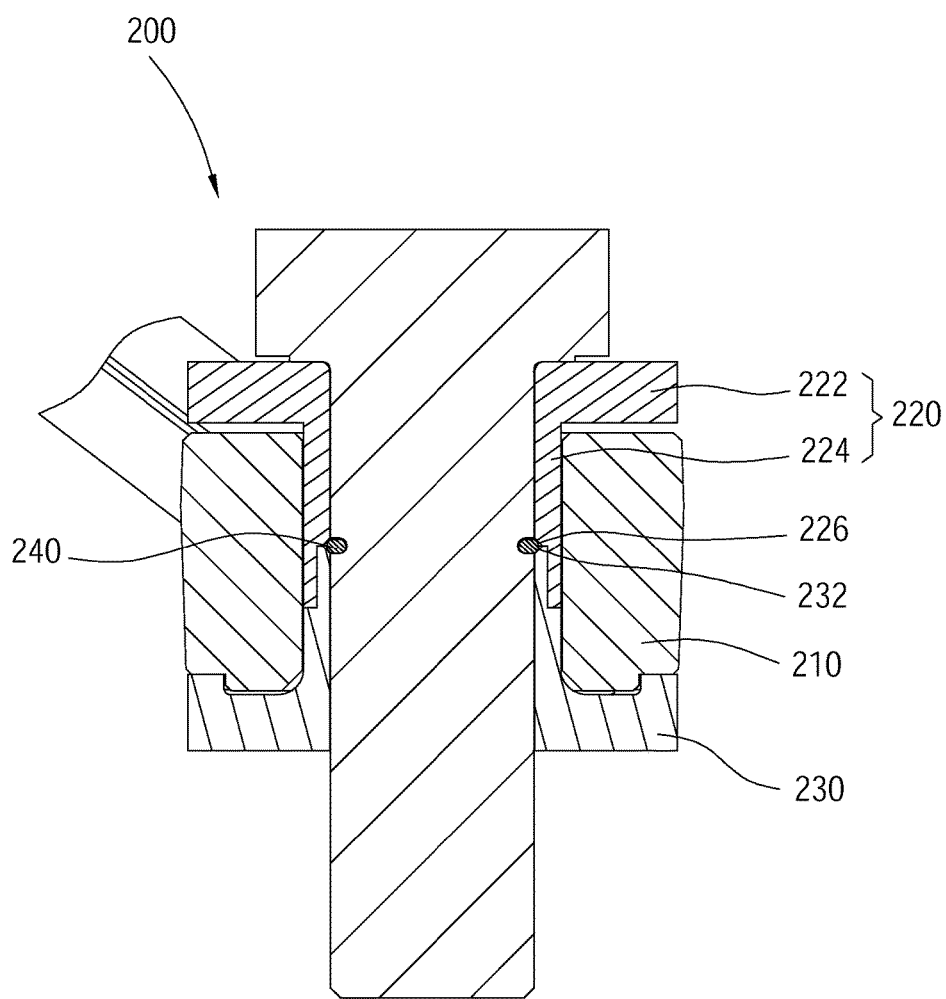
FIG. 5 is a perspective view of the object-connecting device of another embodiment according to the present invention.

An object-connecting device 200 of another embodiment according to the present invention is illustrated in FIG. 5, which has almost the same structures with the object-connecting device 100 of the aforementioned embodiment, except that a first sleeve 220 of the object-connecting device 200 has a base 222 and a body portion 224 connected to the base 222, wherein the body portion 224 passes through a perforation of an engaging member 210 and has a first recess 226. The first recess 226 matches with a second recess 232 of a second sleeve 230 to form a receiving groove for disposing a retaining ring 240, wherein the first recess 226 and the second recess 232 are both located in the perforation of the engaging member 210.

It must be pointed out that the embodiments described above are only some preferred embodiments of the present invention. All equivalent structures which employ the concepts disclosed in this specification and the appended claims should fall within the scope of the present invention.

What is claimed is:

1. An object-connecting device, comprising:
   an engaging member having a perforation;
   a first sleeve having a first axial hole, a first abutting surface, and a first recess;
   a second sleeve which passes through the perforation and has a second axial hole, a second abutting surface, and a second recess, wherein the second axial hole communicates with the first axial hole; the second abutting surface abuts against the first abutting surface; the second recess matches with the first recess to form a receiving groove;
   a bolt passing through the first axial hole and the second axial hole; and
   a retaining ring which is disposed in the receiving groove and is fastened on the bolt.

2. The object-connecting device of claim 1, wherein the bolt has a head and a body; the head abuts against a top surface of the first sleeve; the body passes through the first axial hole and the second axial hole and has an annular groove for receiving the retaining ring.

3. The object-connecting device of claim 1, wherein the first recess is recessed into a wall of the first axial hole adjacent to an edge of the second sleeve, and the second recess is recessed into a wall of the second axial hole adjacent to an edge of the first sleeve.

4. The object-connecting device of claim 1, wherein the first abutting surface and the second abutting surface are tight fitted.

5. The object-connecting device of claim 1, wherein the first abutting surface and the second abutting surface are screw fitted.

6. The object-connecting device of claim 1, wherein the second sleeve has a base and a body portion connected to the base; the base abuts against the engaging member; the body portion passes through the perforation and partially enters the first axial hole, wherein a portion of the body portion that enters the first axial hole has the second recess.

7. The object-connecting device of claim 1, wherein the receiving groove is located within a projection area of the first sleeve in a radial direction of the first sleeve.

8. The object-connecting device of claim 1, wherein the first recess is a chamfer, and the second recess is also a chamfer.

\* \* \* \* \*